July 25, 1961
D. C. LANTZ
2,993,843
REFUSE CONVERTER
Filed March 31, 1959
3 Sheets-Sheet 2
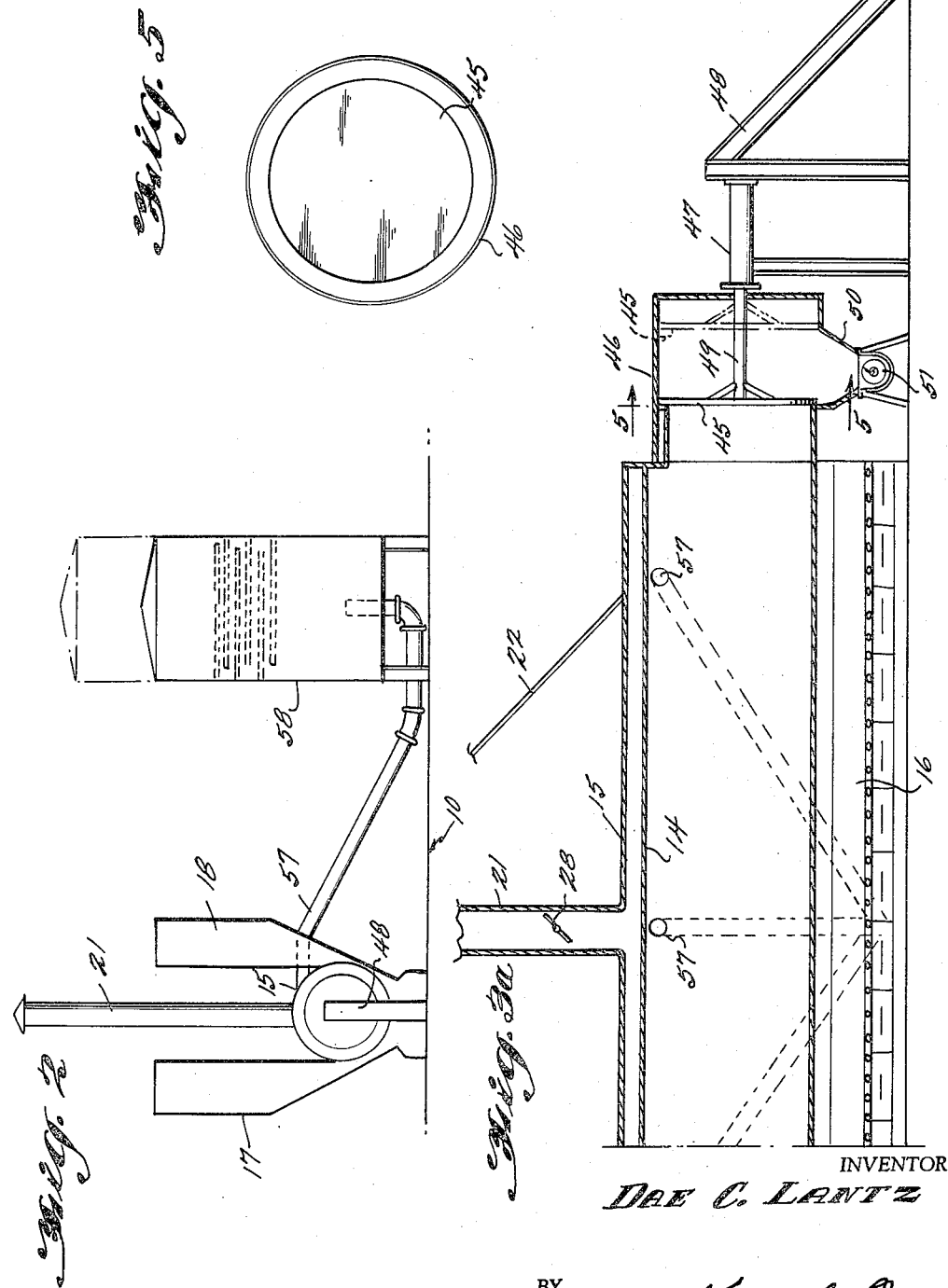
INVENTOR
DAE C. LANTZ
BY
Kimmel & Crowell
ATTORNEYS July 25, 1961
D. C. LANTZ
2,993,843
REFUSE CONVERTER
Filed March 31, 1959
3 Sheets-Sheet 3
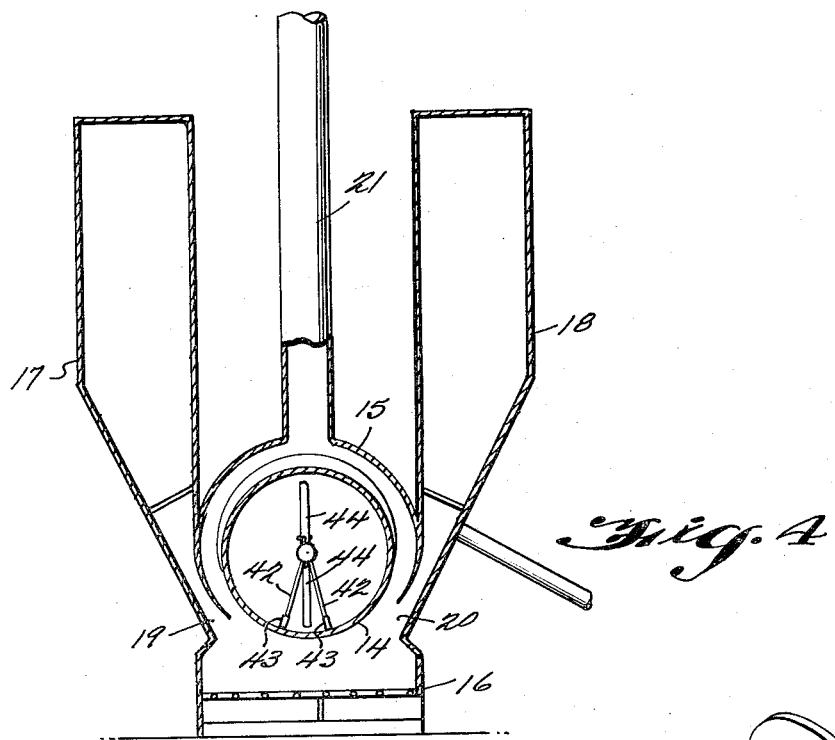
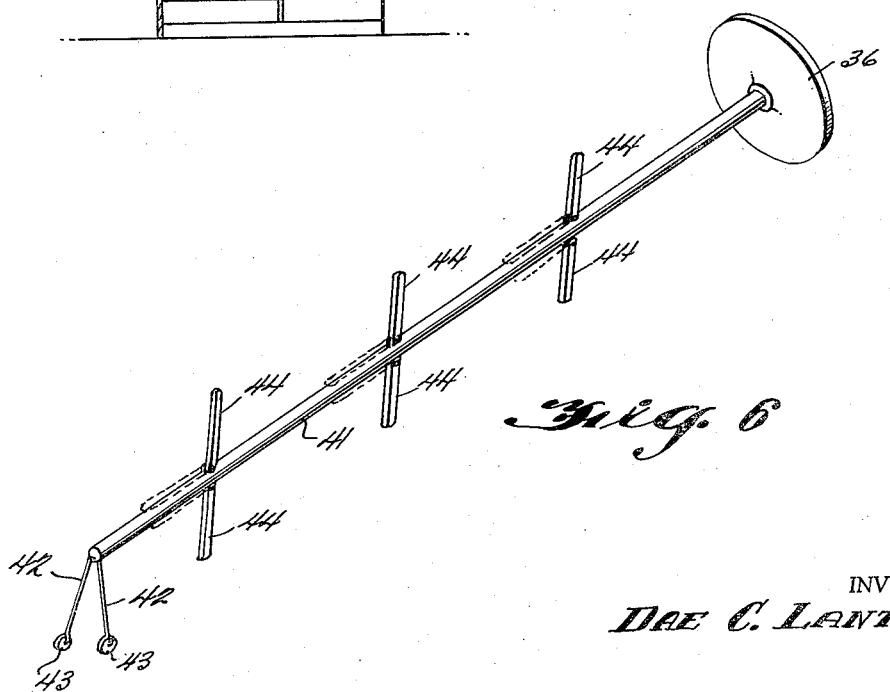
INVENTOR
DAE C. LANTZ
BY
Kimmel & Crowell
ATTORNEYS

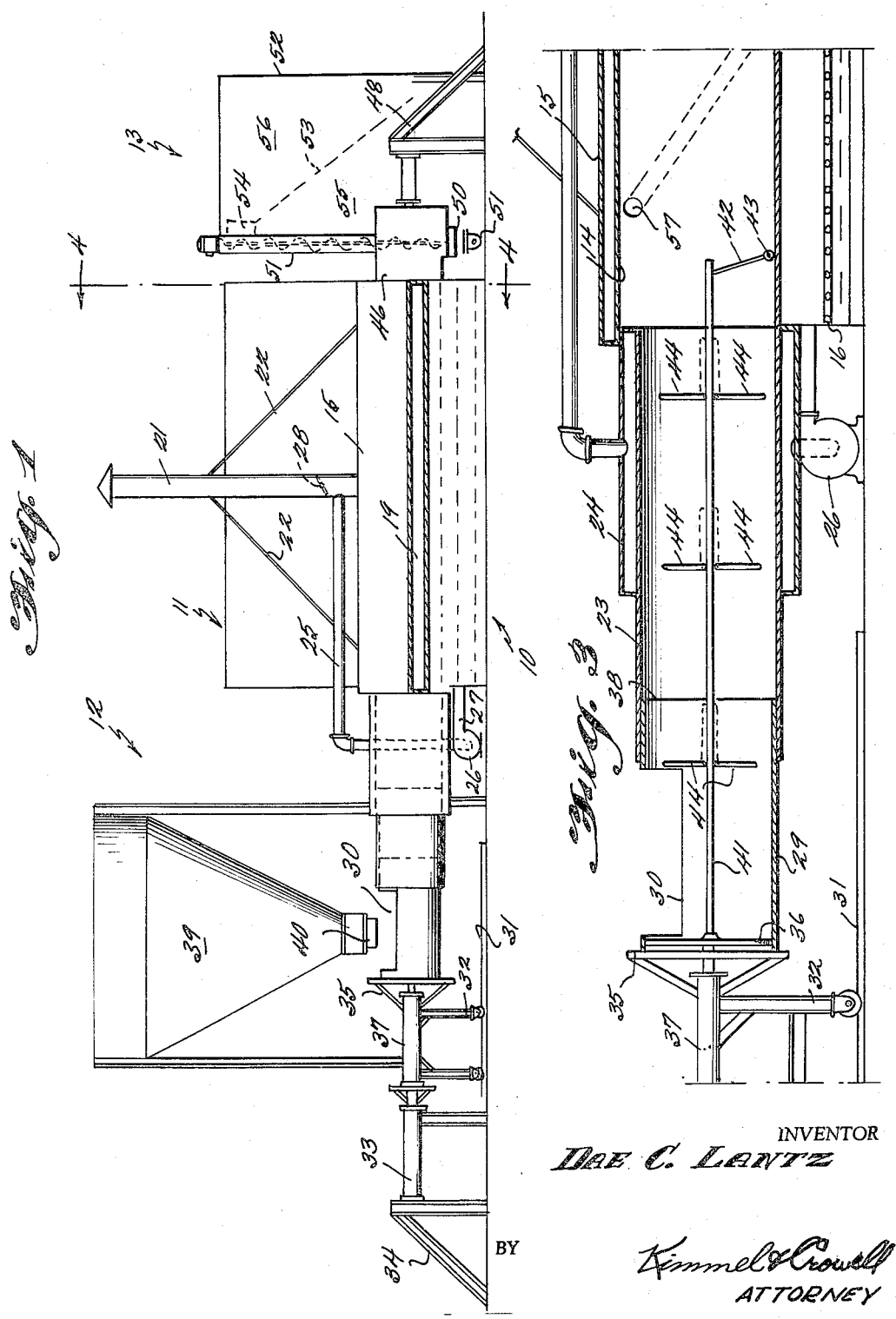

United States Patent Office 2,993,843
Patented July 25, 1961

1

2,993,843
REFUSE CONVERTER
Dae C. Lantz, P.O. Box 3141, Burbank, Calif.
Filed Mar. 31, 1959, Ser. No. 803,298
4 Claims. (Cl. 202—119)

The present invention relates to a refuse converter and particularly to a refuse converter wherein the refuse is reduced to carbon.

An object of the invention is to provide a refuse converter wherein hydraulic means are provided for moving the refuse into the retort of the converter.

A further object of the invention is to provide a refuse converter wherein sealed outlet means are provided for permitting the discharge of the converted refuse without the admission of air to the retort.

Another object of the invention is to provide a refuse converter of the class described above which is inexpensive to manufacture, simple to construct and which can be operated on a substantially continuous basis with a minimum of problems.

Other objects and advantages will become apparent in the following specification when considered in light of the attached drawings, in which:

FIGURE 1 is a side elevation of the invention shown partially broken away and in section for convenience of illustration;

FIGURE 2 is an end elevation of the invention;

FIGURE 3 is a vertical longitudinal section taken through the device;

FIGURE 3a is a vertical longitudinal section taken through the device and is a continuation of FIGURE 3;

FIGURE 4 is an enlarged fragmentary vertical sectional view taken along the line 4—4 of FIGURE 1, looking in the direction of the arrows;

FIGURE 5 is an enlarged transverse section taken along the line 5—5 of FIGURE 3a, looking in the direction of the arrows; and FIGURE 6 is a perspective view of a part of the feed structure shown removed from the retort.

Referring now to the drawings in detail wherein like reference characters indicate like parts throughout the several figures, the reference numeral 10 indicates generally a refuse converter constructed in accordance with the invention.

As seen in FIGURE 1, the refuse converter includes a central retort section, indicated generally at 11, a refuse feed section, indicated generally at 12, and a discharge unit, indicated generally at 13.

The central retort section 11 includes an elongated, generally horizontal cylindrical chamber 14 having a generally cylindrical jacket 15 encompassing the upper portion thereof in spaced relation thereto. A firebox 16 underlies the chamber 14 and is in communication with the space between the chamber 14 and the jacket 15. A pair of charcoal hoppers 17, 18 are arranged on opposite sides of the retort 11 and communicate with the firebox 16 through elongated relatively narrow openings 19, 20, respectively. An elongated upstanding vent chimney 21 is connected to the jacket 15 and extends upwardly therefrom. The chimney 21 is supported by guy wires 22 arranged in downwardly diverging relation and connected to the jacket 15.

An elongated feed tube and pre-heat chamber 23 extends longitudinally of one end of the chamber 14 and has a jacket 24 arranged in spaced parallel encompassing relation thereto. The jacket 24 is sealed at its opposite ends to prevent the escape of gases therefrom. A conduit 25 connects the chimney 21 with the space between the chamber 23 and the jacket 24, as can be clearly seen in FIGURE 1. A blower 26 has the inlet side thereof connected to the space between the jacket 24 and the chamber 23 with the outlet side thereof extending at 27 into the firebox 16. A damper 28 in the chimney 21 is positioned above the conduit 25 so that the products of combustion from the firebox 16 can be directed chiefly through the conduit 25.

A cylindrical feed tube 29 is slidably mounted in the chamber 23 and is provided with an opening 30 in the upper portion thereof. A pair of tracks 31 underlie the chamber 23 and the feed tube 29 supporting a truck 32 thereon for movement toward the chamber 14. A hydraulic ram 33 is mounted on a stationary frame 34 and arranged to move the truck 32 toward the chamber 14. A bracket 35 connects the feed tube 29 to the truck 32 to permit the hydraulic ram 33 to slide the feed tube 29 in the pre-heat feed chamber 23.

A piston 36 is slidably mounted in the feed tube 29 and is longitudinally reciprocated therein by means of a hydraulic ram 37 mounted on the truck 32. The piston 36 is adapted to move from a point adjacent the bracket 35 to the end 38 of the feed tube 29; movement of the piston 36 through the feed tube 29 being effective to move the contents therein into the feed chamber 23.

A hopper 39 is positioned with the outlet end 40 thereof arranged to overlie the opening 30 in the feed tube 29 so that with the feed tube 29 in the positions illustrated in FIGURES 1 and 3, refuse may be dumped from the hopper 39 into the feed tube 29. The feed tube 29, when actuated by the hydraulic ram 33, slides inwardly of the pre-heat and feed chamber 23 so that the contents thereof can be removed therefrom within the preheat chamber 23.

An elongated shaft 41 is detachably secured axially of the piston 36 and extends into the cylindrical chamber 14. A pair of diverging legs 42 having rollers 43 on their lower ends support the shaft 41 at the end thereof opposite the piston 36. A plurality of arms 44 are secured to the shaft 41 by transversely extending pivots and arranged to project outwardly from the shaft 41 on movement of the shaft 41 in a direction into the chamber 14 and to fold to the dotted line position, as seen in FIGURE 6, when the shaft 41 is moved in the opposite direction.

A seal piston 45 is positioned in a discharge chamber 46 extending integrally from the end of the chamber 14 opposite the feed chamber 23. A hydraulic ram 47 is supported on a stationary base 48 with its piston rod 49 extending into the discharge chamber 46 and with the piston 45 mounted thereon. Reciprocation of the hydraulic ram 47 is effective to move the piston 45 from a sealing relation outwardly to the broken line position illustrated in FIGURE 3a to permit discharge of the products from the chamber 14. The discharge chamber 46 has a hopper bottom 50 formed thereon with a screw conveyor 51 positioned therein. The screw conveyor 51 discharges into a storage bin 52 having a central partition 53 and a magnetic separator 54 arranged to discharge metallic materials into the area 55 and carbonaceous material into the area 56 therein. Gas discharge pipes 57 are connected to the upper part of the chamber 14 and lead to the bottom of a gas scrubber and storage tank 58. Menthane gas from the gas storage tank 58 is adapted to be burned in the firebox 16 after the process is started with charcoal, natural gas, or other fuel.

In the use and operation of the invention, refuse stored in the storage hopper 39 is dropped into the feed cylinder 29 and the hydraulic rams 33, 37 are actuated to move the cylinder 29 into the feed chamber 23 and to move the piston 36 through the cylinder 29 to empty the contents thereof into the pre-heat chamber 23. The shaft 41 and the arms 44 agitate the material within the chamber 23 and chamber 14 and assist in feeding the material toward the discharge end of the chamber 14. The feed cylinder 29 is sealed to the feed chamber 23 when in its innermost position to prevent the flow of air into the chamber 14.

The heating of the refuse material in the chamber 14 continues until the mass is reduced to a carbonaceous residue, whereupon the discharge piston 45 is opened to permit the residue to be removed from the chamber 14.

Having thus described the preferred embodiments of the invention, it should be understood that numerous structural modifications and adaptations may be resorted to without departing from the scope of the appended claims.

What is claimed is:

1. A refuse converter comprising an elongated generally cylindrical fixed retort chamber, a pre-heat chamber arranged at one end thereof, a jacket arranged in spaced apart relation with respect to said first named chamber, a second jacket arranged in spaced apart relation to said second chamber, a firebox underlying said first chamber, said firebox communicating with the space between said first chamber and said first jacket with the products of combustion passing therebetween, an axially movable feed cylinder aligned with said preheat chamber for forcing refuse into said pre-heat chamber, means associated with said feed cylinder means for sealing the inlet end of said pre-heat chamber, hydraulic means for sliding said feed cylinder axially of said pre-heat chamber, feed means including a piston and hydraulic means for moving said piston through said feed cylinder for forcing material outwardly from said feed cylinder into said pre-heat chamber, means actuated by said last-named means for agitating material in said pre-heat chamber and said first-named chamber, a discharge chamber connected to said retort chamber at the end thereof opposite said pre-heat chamber, means in said discharge chamber for sealing the discharge end of said retort chamber, and means for conveyong refuse residue from said discharge chamber.

2. A device as claimed in claim 1 wherein the means for agitating material in said pre-heat chamber and said retort chamber comprises a shaft, means in said retort chamber supporting the inner end of said shaft for axial movement, said shaft having the outer end thereof carried by the piston for forcing material from said feed cylinder, and a plurality of arms hingedly secured to said shaft whereby on inward movement of said shaft said arms are extended and on opposite movement of said shaft arms fold into contact with said shaft.

3. A refuse converter comprising a fixed horizontal retort cylinder, furnace means for heating said retort cylinder, a preheat cylinder in axial alignment with and connected to one end of said retort cylinder, a feed cylinder telescopically arranged in said preheat cylinder, said feed cylinder having an opening in its outer end for introduction of said refuse, said opening being closed by said preheat cylinder when said feed cylinder is moved toward said retort cylinder, a piston normally in the extreme outer end of said feed cylinder, a shaft fixed to said piston and extending axially through said preheat cylinder and into said retort cylinder, means carried by the end of said shaft in said retort cylinder for supporting said end of said shaft, said shaft being provided with pivotal arms for pushing said refuse on the inward stroke of said piston, power means for independently moving said feed cylinder and said piston, and closure means for the discharge end of said retort cylinder.

4. The structure of claim 3 including spaced containers for solid fuel disposed on either side of said retort cylinder for gravity feed of fuel to said furnace.

References Cited in the file of this patent

UNITED STATES PATENTS

| 1,339,859 | Nield | May 11, 1920 |
| 1,857,171 | Vandegrift | May 10, 1932 |
| 1,973,506 | Robertson | Sept. 11, 1934 |
| 2,082,870 | Caffrey | June 8, 1937 |
| 2,340,190 | Kohout | Jan. 25, 1944 |

FOREIGN PATENTS

| 210,317 | Great Britain | Jan. 31, 1924 |